United States Patent
Akl et al.

(10) Patent No.: US 12,010,555 B2
(45) Date of Patent: Jun. 11, 2024

(54) NETWORK ENERGY SAVING

(71) Applicant: QUALCOMM Incorporated, San Diego, CA (US)

(72) Inventors: Naeem Akl, Somerville, NJ (US); Navid Abedini, Basking Ridge, NJ (US); Jianghong Luo, Skillman, NJ (US); Tao Luo, San Diego, CA (US); Karl Georg Hampel, Hoboken, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 17/455,142

(22) Filed: Nov. 16, 2021

(65) Prior Publication Data

US 2023/0156524 A1    May 18, 2023

(51) Int. Cl.
*H04W 28/18* (2009.01)
*H04W 28/02* (2009.01)

(52) U.S. Cl.
CPC ....... *H04W 28/18* (2013.01); *H04W 28/0268* (2013.01)

(58) Field of Classification Search
CPC ............. H04W 28/18; H04W 28/0268; H04W 52/0206; H04W 52/0216; H04W 52/0219; H04W 52/0258; H04W 52/0229
See application file for complete search history.

(56) References Cited

U.S. PATENT DOCUMENTS

| | | | |
|---|---|---|---|
| 2019/0387471 A1* | 12/2019 | Salmela | H04W 52/0229 |
| 2021/0105698 A1 | 4/2021 | Jactat | |
| 2021/0168646 A1 | 6/2021 | Chen et al. | |
| 2021/0195430 A1* | 6/2021 | You | H04W 72/04 |
| 2022/0182917 A1* | 6/2022 | Muhammad | H04W 40/248 |
| 2022/0264447 A1* | 8/2022 | Byun | H04W 52/0235 |

OTHER PUBLICATIONS

"5G, NG-RAN, F1 Application Protocol (F1AP) (3GPP TS 38.473 version 16.6.0 Release 16)", ETSI Technical Specification, European Telecommunications Standards Institute (ETSI), 650, Route Des Lucioles, F-06921 Sophia-Antipolis, France, vol. 3GPP RAN, No. V16.6.0 Aug. 26, 2021, XP014400049, pp. 1-468.
International Search Report and Written Opinion—PCT/US2022/078307—ISA/EPO—Jan. 30, 2023.

* cited by examiner

*Primary Examiner* — Khaled M Kassim
*Assistant Examiner* — Najeeb Ansari
(74) *Attorney, Agent, or Firm* — Harrity & Harrity, LLP QUALCOMM Incorporated

(57) ABSTRACT

Various aspects of the present disclosure generally relate to wireless communication. In some aspects, a central network node may transmit, to a distributed network node, a configuration of a statistic associated with a traffic instance for communicating with a user equipment (UE). The central network node may receive an indication associated with the distributed network node communicating with the UE using the traffic instance and in accordance with the statistic. Numerous other aspects are described.

30 Claims, 11 Drawing Sheets

NETWORK ENERGY SAVING

FIELD OF THE DISCLOSURE

Aspects of the present disclosure generally relate to wireless communication and to techniques and apparatuses for network energy saving.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a central network node. The method may include transmitting, to a distributed network node, a configuration of a statistic associated with a traffic instance for communicating with a user equipment (UE). The method may include receiving an indication associated with the distributed network node communicating with the UE using the traffic instance and in accordance with the statistic.

Some aspects described herein relate to a method of wireless communication performed by a distributed network node. The method may include receiving, from a central network node, a configuration of a statistic associated with a traffic instance for communicating with a UE. The method may include transmitting, to the central network node, an indication of a communication with the UE using the traffic instance and in accordance with the statistic.

Some aspects described herein relate to an apparatus for wireless communication performed by a central network node. The apparatus may include a memory and one or more processors, coupled to the memory. The one or more processors may be configured to transmit, to a distributed network node, a configuration of a statistic associated with a traffic instance for communicating with a UE. The one or more processors may be configured to receive an indication associated with the distributed network node communicating with the UE using the traffic instance and in accordance with the statistic.

Some aspects described herein relate to an apparatus for wireless communication performed by a distributed network node. The apparatus may include a memory and one or more processors, coupled to the memory. The one or more processors may be configured to receive, from a central network node, a configuration of a statistic associated with a traffic instance for communicating with a UE. The one or more processors may be configured to transmit, to the central network node, an indication of a communication with the UE using the traffic instance and in accordance with the statistic.

Some aspects described herein relate to a non-transitory computer-readable medium that stores a set of instructions for wireless communication by a central network node. The set of instructions, when executed by one or more processors of the central network node, may cause the central network node to transmit, to a distributed network node, a configuration of a statistic associated with a traffic instance for communicating with a UE. The set of instructions, when executed by one or more processors of the central network node, may cause the central network node to receive an indication associated with the distributed network node communicating with the UE using the traffic instance and in accordance with the statistic.

Some aspects described herein relate to a non-transitory computer-readable medium that stores a set of instructions for wireless communication by a distributed network node. The set of instructions, when executed by one or more processors of the distributed network node, may cause the distributed network node to receive, from a central network node, a configuration of a statistic associated with a traffic instance for communicating with a UE. The set of instructions, when executed by one or more processors of the distributed network node, may cause the distributed network node to transmit, to the central network node, an indication of a communication with the UE using the traffic instance and in accordance with the statistic.

Some aspects described herein relate to an apparatus for wireless communication. The apparatus may include means for transmitting, to a distributed network node, a configuration of a statistic associated with a traffic instance for communicating with a UE. The apparatus may include means for receiving an indication associated with the distributed network node communicating with the UE using the traffic instance and in accordance with the statistic.

Some aspects described herein relate to an apparatus for wireless communication. The apparatus may include means for receiving, from a central network node, a configuration of a statistic associated with a traffic instance for communicating with a UE. The apparatus may include means for transmitting, to the central network node, an indication of a communication with the UE using the traffic instance and in accordance with the statistic.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
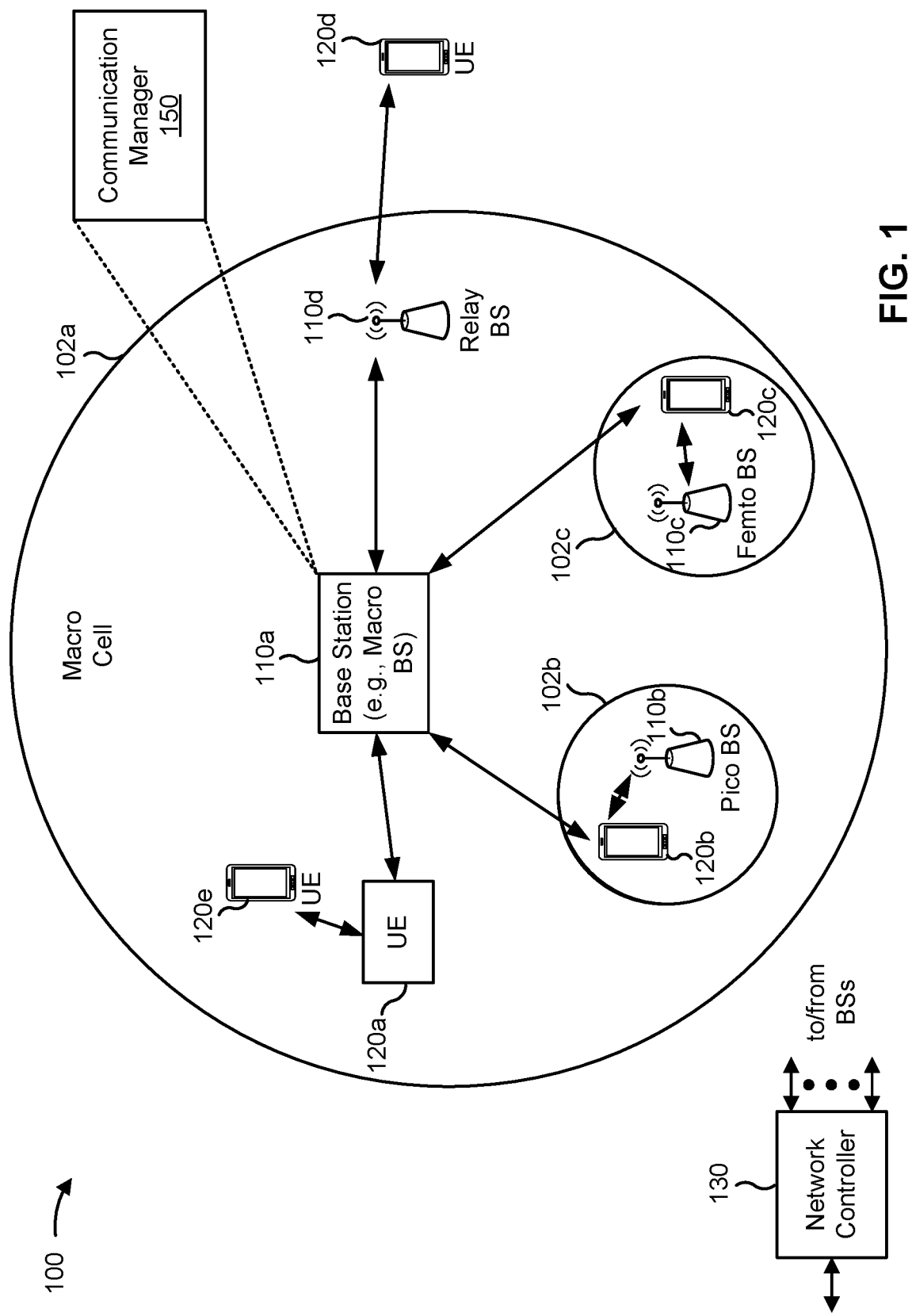
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the central network node may include a communication manager 150. As described in more detail elsewhere herein, the communication manager 150, when implemented in the central network node, may transmit, to a distributed network node, a configuration of a statistic associated with a traffic instance for communicating with a UE; and receive an indication associated with the distributed network node communicating with the UE using the traffic instance and in accordance with the statistic. Additionally, or alternatively, the communication manager 150 may perform one or more other operations described herein.

In some aspects, the distributed network node may include a communication manager 150. As described in more detail elsewhere herein, the communication manager 150, when implemented in the distributed network node, may receive, from a central network node, a configuration of a statistic associated with a traffic instance for communicating with a UE; and transmit, to the central network node, an indication of a communication with the UE using the traffic instance and in accordance with the statistic. Additionally, or alternatively, the communication manager 150 may perform one or more other operations described herein.

As indicated above, FIG. 1 is provided as an example. Other examples may differ from what is described with regard to FIG. 1.

Figure 2:
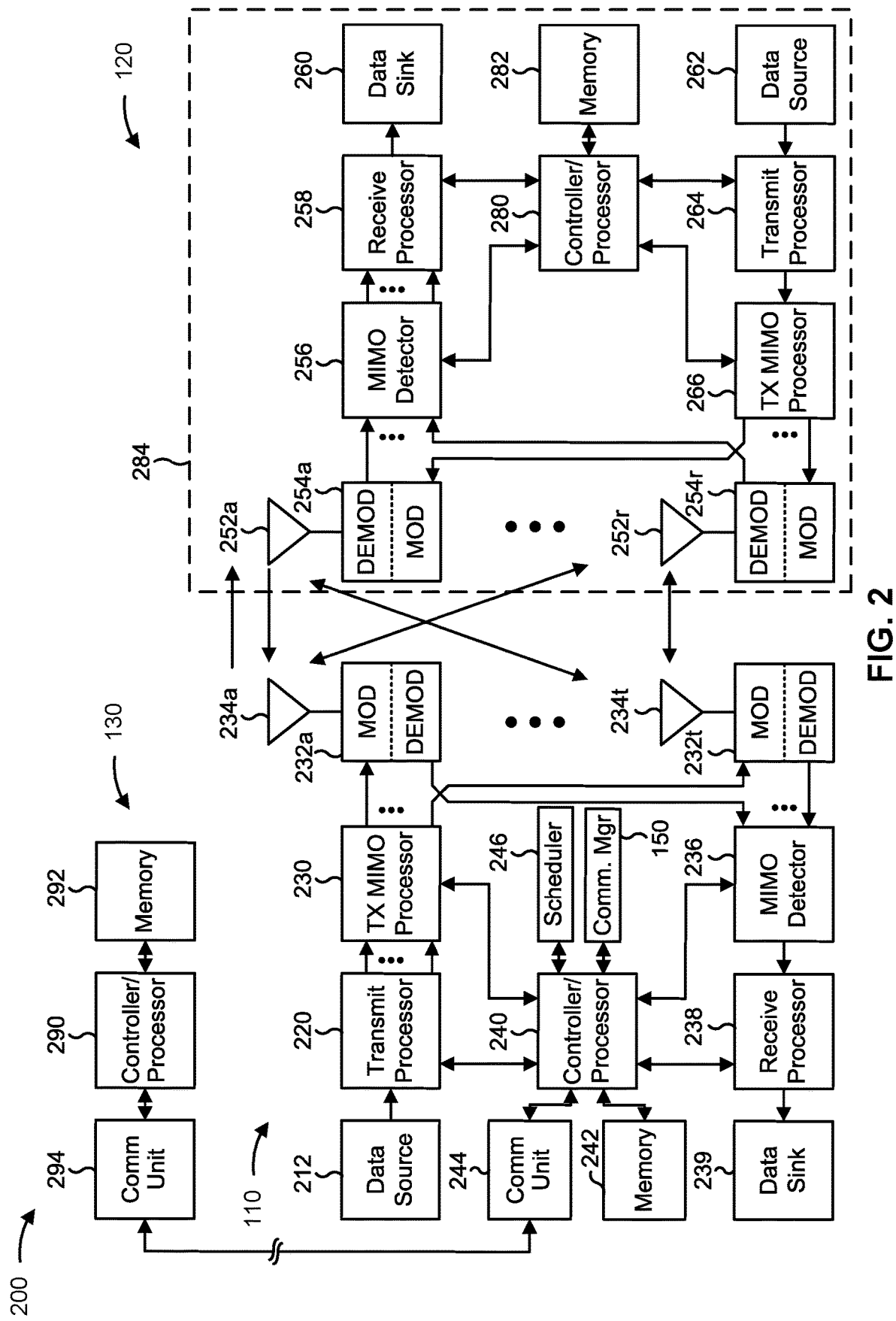
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with network energy saving, as described in more detail elsewhere herein. In some cases, the central network node, or the distributed network node, may be the base station 110, may be included in the base station 110, or may include one or more components of the base station 110 shown in FIG. 2. In some cases, the central network node, or the distributed network node, may be the UE 120, may be included in the UE 120, or may include one or more components of the UE 120 shown in FIG. 2. In some cases, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the central network node includes means for transmitting, to a distributed network node, a configuration of a statistic associated with a traffic instance for communicating with a UE; and/or means for receiving an indication associated with the distributed network node communicating with the UE using the traffic instance and in accordance with the statistic. In some aspects, the means for the central network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the distributed network node includes means for receiving, from a central network node, a configuration of a statistic associated with a traffic instance for communicating with a UE; and/or means for transmitting, to the central network node, an indication of a communication with the UE using the traffic instance and in accordance with the statistic. In some aspects, the means for the distributed network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
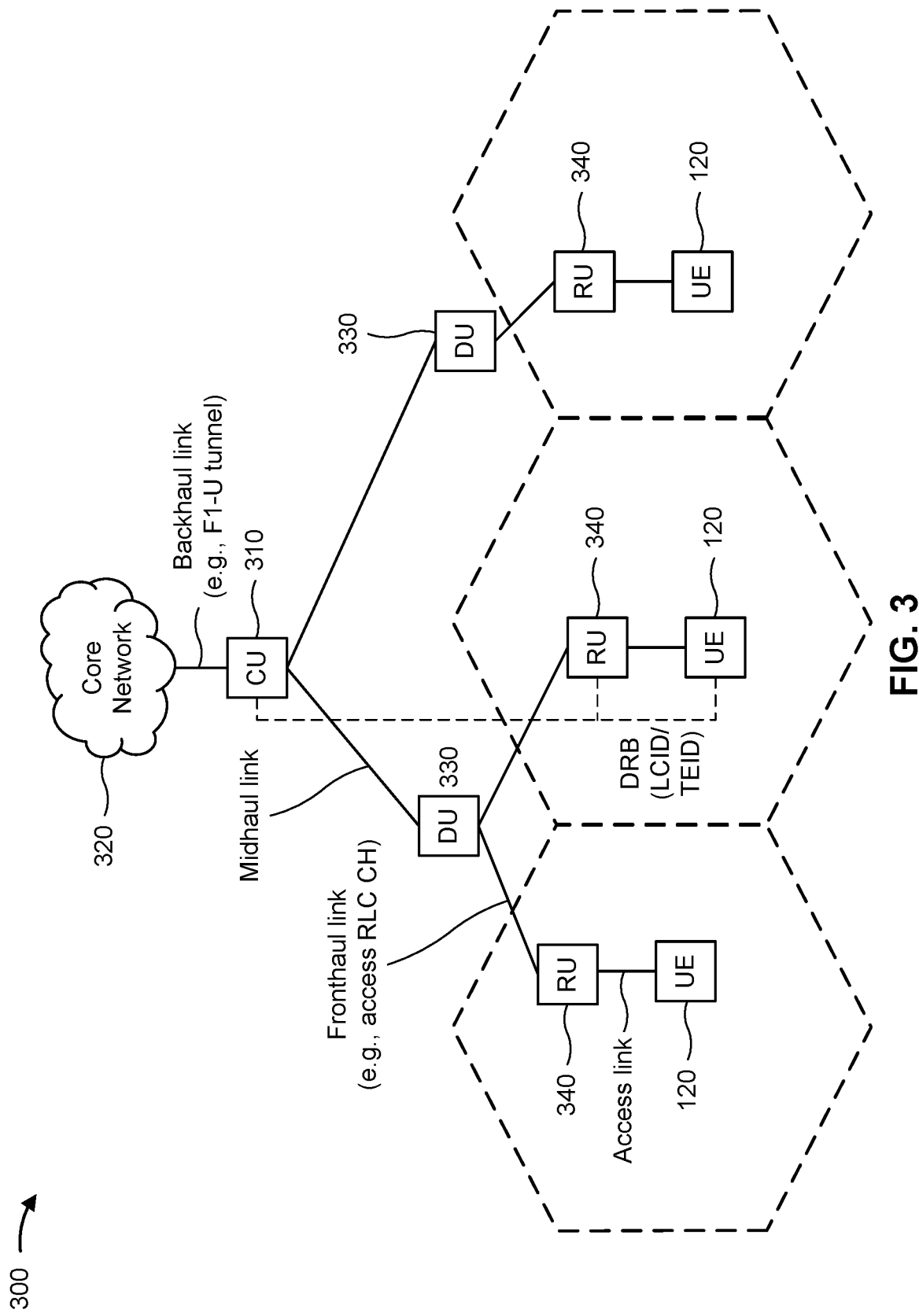
FIG. 3 is a diagram illustrating an example of an open radio access network (O-RAN) architecture, in accordance with the present disclosure.

FIG. 3 is a diagram illustrating an example 300 of an O-RAN architecture, in accordance with the present disclosure. As shown in FIG. 3, the O-RAN architecture may include a control unit (CU) 310 that communicates with a core network 320 via a backhaul link. In some cases, the backhaul link may be an F1-U tunnel. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. In some cases, one or more of the fronthaul links may be access radio link control (RLC) channels (CH). The DUs 330 and the RUs 340 may also be referred to as O-RAN DUs (O-DUs) 330 and O-RAN RUs (O-RUs) 340, respectively. In some cases, the CUs 310 may communicate with the RUs 340 and/or the UEs 120 using a data radio bearer (DRB). The DRB may be identified using one or more of a DRB identifier, a logical channel identifier (LCID) or a tunnel endpoint identifier (TED).

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host an RLC layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC) and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As described in more detail herein, the DU 330 may receive a statistic from the CU 310 that is associated with a traffic instance for communicating with the UE 120. The statistic may indicate timing information associated with a random traffic communication. The DU 330 may transmit data, or not transmit data, to the UE 120 in accordance with the statistic, thereby saving energy at the DU 330.

As indicated above, FIG. 3 is provided as an example. Other examples may differ from what is described with regard to FIG. 3.

Figure 4:
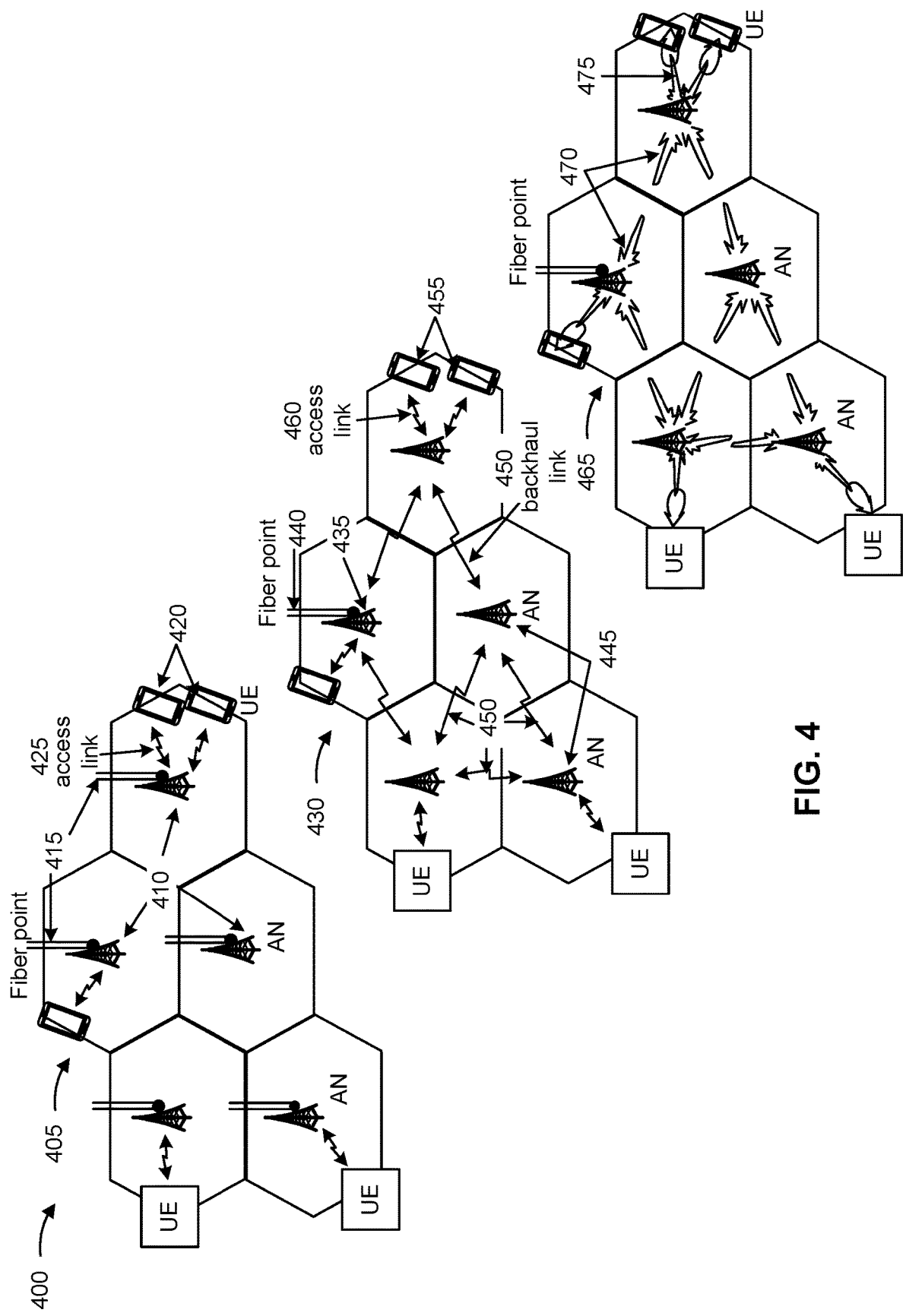
FIG. 4 is a diagram illustrating an example of radio access networks, in accordance with the present disclosure.

FIG. 4 is a diagram illustrating examples 400 of radio access networks, in accordance with the present disclosure.

As shown by reference number 405, a traditional (e.g., 3G, 4G, or LTE) radio access network may include multiple base stations 410 (e.g., access nodes (AN)), where each base station 410 communicates with a core network via a wired backhaul link 415, such as a fiber connection. A base station 410 may communicate with a UE 420 via an access link 425, which may be a wireless link. In some aspects, a base station 410 shown in FIG. 4 may be a base station 110 shown in FIG. 1. In some aspects, a UE 420 shown in FIG. 4 may be a UE 120 shown in FIG. 1.

As shown by reference number 430, a radio access network may include a wireless backhaul network, sometimes referred to as an integrated access and backhaul (IAB) network. In an IAB network, at least one base station is an anchor base station 435 that communicates with a core network via a wired backhaul link 440, such as a fiber connection. An anchor base station 435 may also be referred to as an IAB donor (or IAB-donor). The IAB network may include one or more non-anchor base stations 445, sometimes referred to as relay base stations or IAB nodes (or IAB-nodes). The non-anchor base station 445 may communicate directly or indirectly with the anchor base station 435 via one or more backhaul links 450 (e.g., via one or more non-anchor base stations 445) to form a backhaul path to the core network for carrying backhaul traffic. Backhaul link 450 may be a wireless link. Anchor base station(s) 435 and/or non-anchor base station(s) 445 may communicate with one or more UEs 455 via access links 460, which may be wireless links for carrying access traffic. In some aspects, an anchor base station 435 and/or a non-anchor base station 445 shown in FIG. 4 may be a base station 110 shown in FIG. 1. In some aspects, a UE 455 shown in FIG. 4 may be a UE 120 shown in FIG. 1.

As shown by reference number 465, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 470 between base stations may use millimeter wave signals to carry information and/or may be directed toward a target base station using beamforming. Similarly, the wireless access links 475 between a UE and a base station may use millimeter wave signals and/or may be directed toward a target wireless node (e.g., a UE and/or a base station). In this way, inter-link interference may be reduced.

The configuration of base stations and UEs in FIG. 4 is shown as an example, and other examples are contemplated. For example, one or more base stations illustrated in FIG. 4 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 4 is provided as an example. Other examples may differ from what is described with regard to FIG. 4.

Figure 5:
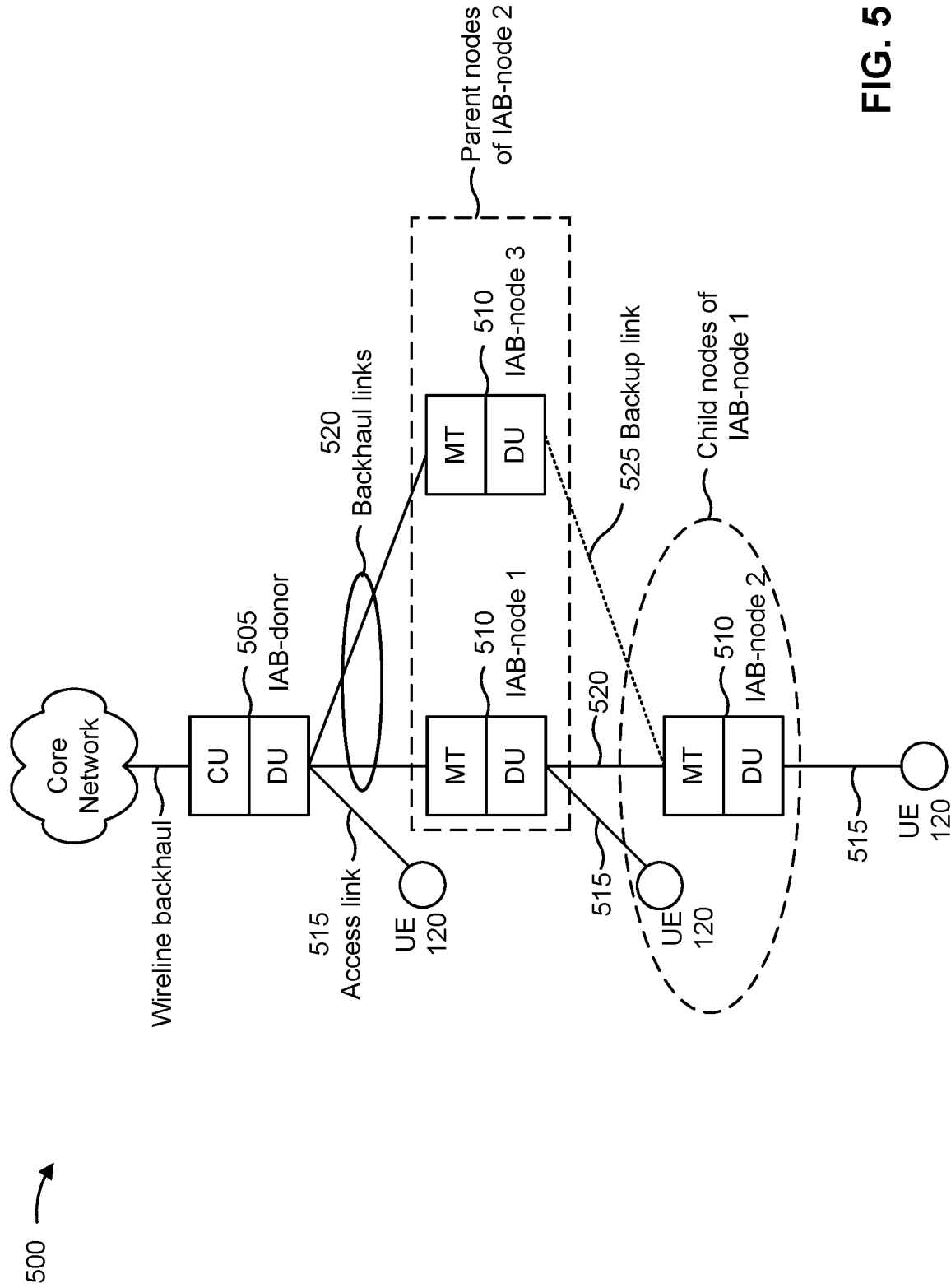
FIG. 5 is a diagram illustrating an example of an integrated access and backhaul (IAB) network architecture, in accordance with the present disclosure.

FIG. 5 is a diagram illustrating an example 500 of an IAB network architecture, in accordance with the present disclosure.

As shown in FIG. 5, an IAB network may include an IAB donor 505 (shown as IAB-donor) that connects to a core network via a wired connection (shown as a wireline backhaul). For example, an Ng interface of an IAB donor 505 may terminate at a core network. Additionally, or alternatively, an IAB donor 505 may connect to one or more devices of the core network that provide a core access and mobility management function (e.g., AMF). In some aspects, an IAB donor 505 may include a base station 110, such as an anchor base station, as described above in connection with 4. As shown, an IAB donor 505 may include a CU, which may perform access node controller (ANC) functions and/or AMF functions. The CU may configure a DU of the IAB donor 505 and/or may configure one or more IAB nodes 510 (e.g., a mobile termination (MT) and/or a DU of an IAB node 510) that connect to the core network via the IAB donor 505. Thus, a CU of an IAB donor 505 may control and/or configure the entire IAB network that connects to the core network via the IAB donor 505, such as by using control messages and/or configuration messages (e.g., an RRC configuration message or an F1 application protocol (F1-AP) message). In some aspects, the one or more DUs may include an O-RAN DU and an O-RAN RU, as described herein.

In some aspects, the IAB network architecture may support open RAN (O-RAN) operability. O-RAN provides for disaggregation of hardware and software, as well as interfacing between hardware and software. In some aspects, O-RAN may use an architecture with a CU (such as a CU of IAB donor 505), one or more DUs (which may be termed an O-RAN DU or O-DU), and one or more RUs (which may be termed an O-RAN RU or O-RU). The RU may perform digital front end functions, some physical layer functions, digital beamforming, and so on. The DU may handle RLC, MAC, and some PHY layer functions. The CU may handle certain gNB functions, such as transfer of user data, mobility control, radio access network (RAN) sharing, positioning, session management, and so on. The CU may control the operation of one or more DUs, and the one or more DUs may control the operation of one or more RUs.

In some aspects, the CU may host one or more higher layer control functions. Such control functions can include RRC, PDCP, SDAP, or the like. Each control function can be implemented with an interface configured to communicate signals with other control functions hosted by the CU. The CU may be configured to handle user plane functionality (i.e., Central Unit—User Plane (CU-UP)), control plane functionality (i.e., Central Unit—Control Plane (CU-CP)), or a combination thereof. In some implementations, the CU can be logically split into one or more CU-UP units and one or more CU-CP units. The CU can be implemented to communicate with the DU, as necessary, for network control and signaling.

The DU may correspond to a logical unit that includes one or more base station functions to control the operation of one or more RUs. In some aspects, the DU may host one or more of an RLC layer, a MAC layer, and one or more high PHY layers (such as modules for FEC encoding and decoding, scrambling, modulation and demodulation, or the like) depending, at least in part, on a lower layer functional split. Each layer (or module) can be implemented with an interface configured to communicate signals with other layers (and modules) hosted by the DU, or with the control functions hosted by the CU.

Lower-level functionality can be implemented by one or more RUs. In some deployments, an RU, controlled by a DU, may correspond to a logical node that hosts RF processing functions, or low-PHY layer functions (such as performing FFT, iFFT, digital beamforming, PRACH extraction and filtering, or the like), or both, based at least in part on the lower layer functional split. In such an architecture, the RU(s) can be implemented to handle OTA communication with a UE 120. In some implementations, real-time and non-real-time aspects of control and user plane communication with the RU(s) can be controlled by the corresponding DU. In some scenarios, this configuration can enable the DU(s) and the CU to be implemented in a cloud-based RAN architecture, such as a virtual RAN (VRAN) architecture.

As further shown in FIG. 5, the IAB network may include IAB nodes 510 (shown as IAB-node 1, IAB-node 2, and IAB-node 3) that connect to the core network via the IAB donor 505. As shown, an IAB node 510 may include MT functions (also sometimes referred to as UE functions (UEF)) and may include DU functions (also sometimes referred to as access node functions (ANF)). The MT functions of an IAB node 510 (e.g., a child node) may be controlled and/or scheduled by another IAB node 510 (e.g., a parent node of the child node) and/or by an IAB donor 505. The DU functions of an IAB node 510 (e.g., a parent node) may control and/or schedule other IAB nodes 510 (e.g., child nodes of the parent node) and/or UEs 120. Thus, a DU may be referred to as a scheduling node or a scheduling component, and an MT may be referred to as a scheduled node or a scheduled component. In some aspects, an IAB donor 505 may include DU functions and not MT functions. That is, an IAB donor 505 may configure, control, and/or schedule communications of IAB nodes 510 and/or UEs 120. A UE 120 may include only MT functions, and not DU functions. That is, communications of a UE 120 may be controlled and/or scheduled by an IAB donor 505 and/or an IAB node 510 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 505 or an IAB node 510, and a child node may be an IAB node 510 or a UE 120. Communications of an MT function of a child node may be controlled and/or scheduled by a parent node of the child node.

As further shown in FIG. 5, a link between a UE 120 (e.g., which only has MT functions, and not DU functions) and an IAB donor 505, or between a UE 120 and an IAB node 510, may be referred to as an access link 515. Access link 515 may be a wireless access link that provides a UE 120 with radio access to a core network via an IAB donor 505, and optionally via one or more IAB nodes 510. Thus, the network illustrated in 5 may be referred to as a multi-hop network or a wireless multi-hop network.

As further shown in FIG. 5, a link between an IAB donor 505 and an IAB node 510 or between two IAB nodes 510 may be referred to as a backhaul link 520. Backhaul link 520 may be a wireless backhaul link that provides an IAB node 510 with radio access to a core network via an IAB donor 505, and optionally via one or more other IAB nodes 510. In an IAB network, network resources for wireless communications (e.g., time resources, frequency resources, and/or spatial resources) may be shared between access links 515 and backhaul links 520. In some aspects, a backhaul link 520 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 525 between IAB-node 2 and IAB-node 3 may be used for backhaul communications if a primary backhaul link between IAB-node 2 and IAB-node 1 fails. As used herein, a node or a wireless node may refer to an IAB donor 505 or an IAB node 510.

As described in more detail herein, the DU may receive a statistic from the CU that is associated with a traffic instance for communicating with the UE 120. The statistic may indicate timing information associated with a random traffic communication. The DU may transmit data, or not transmit data, to the UE 120 in accordance with the statistic, thereby saving energy at the DU.

As indicated above, FIG. 5 is provided as an example. Other examples may differ from what is described with regard to FIG. 5.

Figure 6:
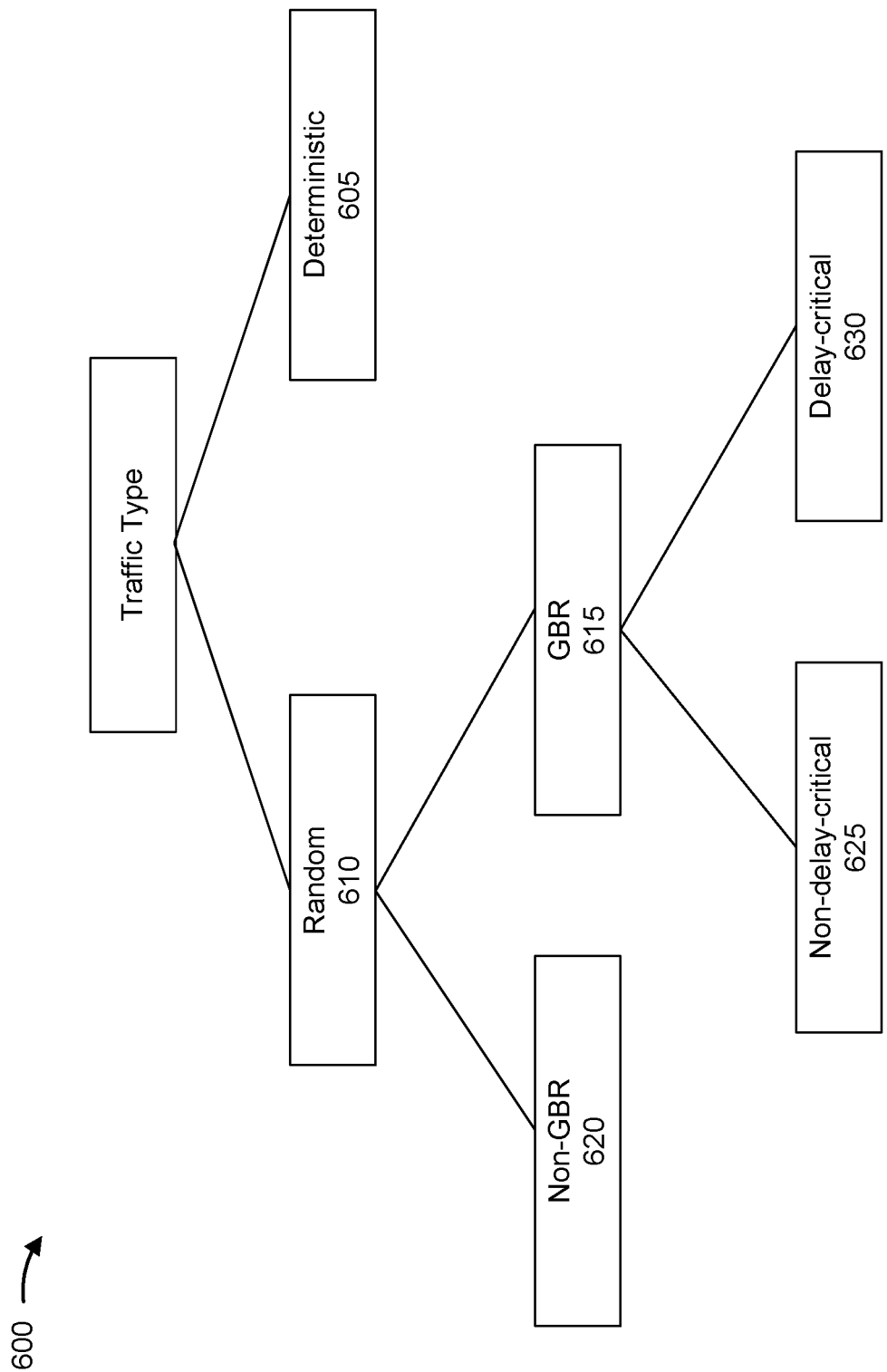
FIG. 6 is a diagram illustrating an example of network traffic types, in accordance with the present disclosure.

FIG. 6 is a diagram illustrating an example 600 of network traffic types, in accordance with the present disclosure.

In some cases, a packet delay budget (PDB) may define a maximum amount of time that a packet may be delayed (e.g., between the UE 120 and an N6 termination point at the user plane function (UPF)). The PDB may apply to a downlink packet received by the UPF over the N6 interface, and/or to an uplink packet sent by the UE 120.

In some cases, an averaging window (AW) may define a duration over which a guaranteed flow bit rate (GFBR) and a maximum flow bit rate (MFBR) are measured. The objective of specifying an averaging window may be to prevent a network node achieving the GFBR by making a large, short term resource allocation followed by a long period of no resource allocation. A short averaging window forces the network node to make smaller, more frequent resource allocations.

The GFBR may define the maximum bit rate which can be expected from the traffic when measured across the AW. The GFBR may be specified independently for the uplink and the downlink.

The MFBR may define the maximum bit rate which can be expected from the traffic when measured across the AW. Packets may be dropped by a throughput shaping function within the network node once the MFBR has been achieved. The MFBR may be specified independently for uplink and downlink.

The maximum data burst volume (MDBV) may define the maximum quantity of data that the network node is required to serve within a time window equal to the network node's contribution towards the total PDB.

In some cases, data traffic may be characterized as deterministic traffic 605 or random traffic 610. Deterministic traffic 605 may be traffic that has strict synchronization requirements and high reliability and availability requirements. The deterministic traffic 605 may be referred to as scheduled traffic. A DU, such as the DU 330, that is communicating deterministic traffic 605, may be able to determine whether or not to enter a sleep state (e.g., in accordance with a discontinuous reception (DRX) cycle) based at least in part on the traffic schedule. Thus, the DU 330 can coordinate its energy savings based at least in part on the traffic schedule. In contrast, for random traffic 610, the DU 330 may not be able to determine ahead of time whether or not to enter a sleep state, since the DU 330 may not know when the next packet is arriving. In some cases, data that is received during a sleep state of the DU 330 may need to be buffered.

In some cases, random traffic 610 may characterized as guaranteed bitrate (GBR) traffic 615 or non-GBR traffic 620. GBR traffic 615 may include traffic that is received according to the guaranteed bitrate. Network resources for the GBR traffic 615 may be dedicated and/or permanently allocated (e.g., by admission control or "on demand"). GBR traffic 615 may provide the GFBR to the end user. GBR traffic 615 may typically be used for time sensitive applications, such as voice calls and video calls. In contrast, non-GBR traffic 620 may not provide the GFBR to the end user. This type of traffic may be used for non-time sensitive applications, such as web browsing, buffered streaming, and instant messenger applications. In some cases, the DU 330 may determine not to drop non-GBR 620 traffic, even if the traffic experiences a certain amount packet loss and delay. In some cases, the DU 330 may be configured to buffer the data, and the DU 330 may schedule the UE 120 based at least in part on the energy savings schedule of the DU 330. In some cases, packets belonging to GBR traffic 615 may be prioritized over packets belonging to non-GBR traffic 620, at least until the GFBR has been achieved. Packets belonging to non-GBR traffic 620 may be treated as "best effort" packets, relative to packets belonging to GBR traffic 615. The network node may not commit to providing more than the GFBR, so GBR packets can be given lower priority once the GFBR has been reached.

In some cases, GBR traffic 615 may be characterized as non-delay-critical traffic 625 or delay-critical traffic 630. Non-delay-critical traffic 625 may have a "soft" PDB requirement. Thus, the DU 330 may drop, but is not required to drop, packets that do not meet certain requirements, such as packet loss or packet delay requirements. Whether or not the DU 330 drops the packets may be dependent on the application related to the data traffic. In contrast, delay-critical traffic 630 that does not meet the certain requirements is determined to be expired, and may add to the packet error rate. Delay-critical traffic 630 may also be referred to as time-sensitive traffic. Some example applications for delay-critical traffic 630 may include automation and intelligent transport systems.

As described above, the distributed network node (e.g., the DU) may be configured with certain information for providing data traffic to the UE. For example, the distributed network node may determine that the network node needs to serve at least the GFBR, and no more than the MFBR, within the AW. For delay-critical traffic, the distributed network node may determine that no more than the MDBV needs to be served within the PDB period. However, the distributed network node may not be able to determine the temporal statistics of the distribution of traffic within the AW.

Techniques and apparatuses are described herein for network energy savings. In some aspects, a central network node may transmit, to a distributed network node, a configuration of a statistic associated with a traffic instance for communicating with a UE. For example, the statistic may characterize an arrival process associated with the traffic instance. In some aspects, the statistic may indicate timing information associated with a random traffic communication, or an amount of data associated with the random traffic communication. The traffic instance may be a communication channel between the distributed network node and the UE. The central network node may receive an indication associated with the distributed network node communicating with the UE using the traffic instance and in accordance with the statistic. For example, the central network node may receive an indication that the distributed network node is communicating with the UE, or an indication that the distributed network node will communicate with the UE, using the traffic instance and in accordance with the statistic.

As described above, the distributed network node may not be able to determine an energy saving schedule when the distributed network node is receiving random traffic, such as GBR random traffic. However, configuring the distributed network node with the statistic may enable the distributed network node to perform energy savings, even when the distributed network node is receiving the random traffic. For example, the statistic may indicate one or more parameters for transmitting data to the UE, or receiving data from the UE, using the traffic instance and in accordance with an energy savings schedule of the network node. Since the distributed network node can determine, according to the statistic, how often the traffic instance of the UE needs to be served, the network node may be able to determine whether serving the UE, or the traffic instance of the UE, will impact the ability to achieve or maintain energy savings at the network node.

As indicated above, FIG. 6 is provided as an example. Other examples may differ from what is described with regard to FIG. 6.

Figure 7:
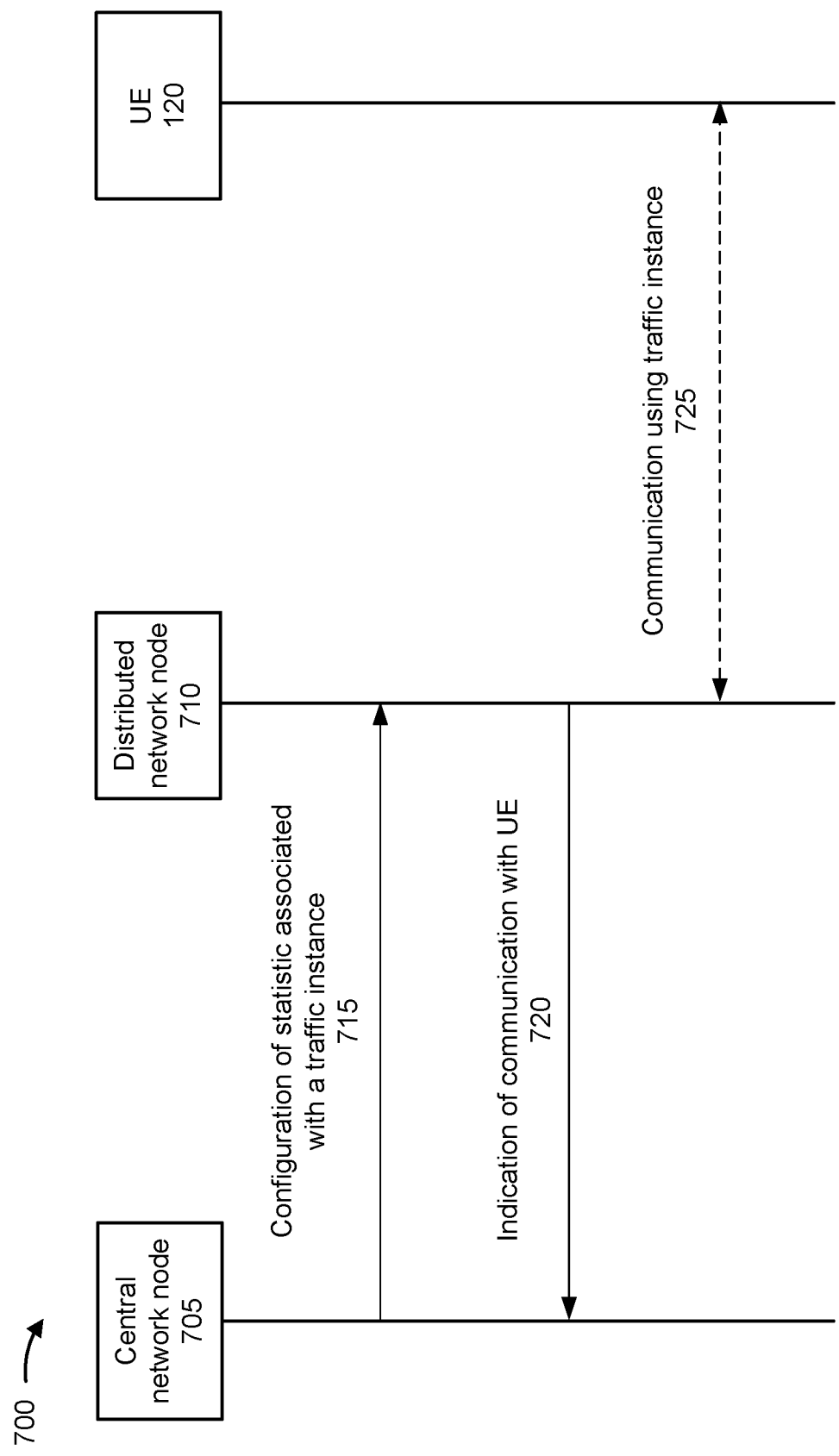
FIG. 7 is a diagram illustrating an example associated with network energy saving, in accordance with the present disclosure.

FIG. 7 is a diagram illustrating an example 700 of network energy saving, in accordance with the present disclosure. As shown, a network node, such as the central network node 705, may communicate with another network node, such as the distributed network node 710. The central network node 705 may include some or all of the features of the CU 310, and the distributed network node 710 may include some or all of the features of the DU 330, as described above. The network nodes (e.g., the distributed network node 710) may communicate with a UE, such as the UE 120.

As shown in connection with reference number 715, the central network node 705 may transmit, and the distributed network node 710 may receive, a configuration of a statistic associated with a traffic instance. In some aspects, the statistic may indicate timing information associated with a communication, such as a random traffic communication. In some aspects, the traffic instance be used for communications between the distributed network node 710 and the UE 120. For example, the traffic instance may be a DRB, an F1-U tunnel, a QoS flow, or a BH RLC channel. In some aspects, the traffic instance may be configured for communicating uplink data, downlink data, or both uplink data and downlink data. For example, the traffic instance may be configured for communicating one or more uplink protocol data units (PDUs), one or more downlink PDUs, or both uplink PDUs and downlink PDUs.

In some aspects, the traffic instance may be used for communicating GBR data traffic. For example, the distributed network node 710 may be configured to communicate GBR data traffic using the traffic instance. The GBR traffic may include traffic that is communicated according to the guaranteed bitrate. The GBR traffic may provide the GFBR to the UE 110. In contrast, non-GBR traffic may not provide the GFBR to the UE 110.

In some aspects, the traffic instance may be used for communicating delay-critical GBR data. For example, the distributed network node 710 may be configured to communicate delay-critical GBR data traffic using the traffic instance. In some aspects, delay-critical GBR traffic (e.g., time-sensitive traffic) that does not meet the certain requirements (e.g., packet loss or delay requirements) may be dropped by the distributed network node 710. In contrast, the distributed network node 710 may drop, but is not required to drop, non-delay-critical traffic that does not meet the packet loss or delay requirements. In this example, the expired packets may not count as lost packets, and therefore may not affect the PER.

In some aspects, the statistic may indicate a time interval associated with a rate requirement for communicating data using the traffic instance. For example, the statistic may indicate an AW for communicating the GBR traffic. The AW may define a duration over which the GFBR and the MFBR are measured. As described above, a short AW may prevent the distributed network node 710 from making large, short term resource allocations followed by long periods of no resource allocations. Thus, a short AW may force the distributed network node 710 to make smaller, more frequent resource allocations, thereby preventing the distributed network node 710 from transmitted data that exceeds the MDBV.

In some aspects, the statistic may indicate a time period (e.g., a granularity) for measuring a burst volume of data that is communicated using the traffic instance. For example, the time period may be, or may be associated with, a PDB of the traffic instance. The PDB may define the maximum amount of time that a packet may be delayed. In some aspects, it may be beneficial for the distributed network node 710 to limit the number of burst volumes of data, and the amount of data in the burst volumes of data, such that the distributed network node 710 may serve at least the GFBR, but no more than the MFBR, within the AW.

The statistic may indicate one or more parameters for communicating burst volumes of data. In some aspects, the statistic may indicate a distribution of a burst volume of data that is communicated using the traffic instance. For example, the statistic may indicate a variance of the burst volume of data for the traffic instance across a plurality of PDB periods within an averaging window interval. In some aspects, the statistic may indicate an average volume of a burst volume of data that is communicated using the traffic instance. For example, the statistic may indicate that X percent of the PDB periods within the averaging window have burst volume of data of the traffic instance that is less than Y bits. In some aspects, the statistic may indicate a higher order moment of a burst volume of data that is communicated using the traffic instance. For example, the statistic may indicate that Z percent of the PDB periods within the averaging window have zero burst volume of data of the traffic instance. In some aspects, the statistic may indicate a maximum percentage of time periods, in a time interval, within which a burst volume of data may exceed a threshold, or drop below the threshold. For example, the statistic may indicate that a portion of the averaging window associated with the traffic instance is idle.

As described above, the traffic instance may be used for communications between the distributed network node 710 and the UE 120, and the statistic may indicate information (e.g., timing information) for the distributed network node 710 to communicate with the UE 120 using the traffic instance.

In some aspects, the distributed network node may share the statistic, or the information associated with the statistic, with one or more other network nodes. For example, the distributed network node 710 may transmit the configuration of the statistic to one or more other network nodes, such as one or more other central network nodes 705, or one or more other distributed network nodes 710. In some aspects, the distributed network node 710 may transmit a time interval for measuring the statistic, or a time interval for reporting the statistic, to the one or more other central network nodes 705 or the one or more other distributed network nodes 710. The one or more other network nodes may transmit a confirmation to the distributed network node 710 based at least in part on receiving the statistic.

As shown in connection with reference number 720, the distributed network node 710 may transmit, and the central network node 705 may receive, an indication associated with the distributed network node 710 communicating with the UE 120. In some aspects, the indication associated with the distributed network node 710 communicating with the UE 120 may be an indication that the distributed network node will communicate with the UE 120 using the traffic instance and in accordance with the statistic. In some aspects, the indication associated with the distributed network node 710 communicating with the UE 120 may be an indication that the distributed network node 710 is communicating with the UE 120, or has communicated with the UE 120, using the traffic instance and in accordance with the statistic.

In some aspects, the distributed network node 710 may perform admission of the UE 120 (e.g., may determine to communicate with the UE 120) based at least in part on the statistic, and/or based at least in part on an energy saving schedule of the distributed network node, a distributed network node cell, or a distributed network node resource associated with the statistic. For example, the distributed network node 710 may determine to communicate with the UE 120 using the traffic instance, and in accordance with the statistic, if the energy saving schedule of the UE 120 (e.g., the load or pattern arrival of the traffic instance) does not conflict or interfere with an existing energy saving schedule of the distributed network node 710.

As shown in connection with reference number 725, the distributed network node 710 may communicate with the UE 120. For example, the distributed network node 710 and the UE 120 may communicate GBR traffic (e.g., delay-critical GBR traffic or non-delay-critical GBR traffic) using the traffic instance, such as the DRB, the F1-U tunnel, the QoS flow, or the BH RLC channel. The distributed network node 710 and the UE 120 may communicate in accordance with the statistic and/or the energy savings schedule of the network node 710. For example, the distributed network node 710 and the UE 120 may communicate using the timing information indicated in the statistic and/or the one or more parameters for communicating burst volumes of data.

As described above, the distributed network node 710 may not be able to determine an energy saving schedule when the distributed network node is receiving random traffic, such as GBR random traffic. However, configuring the distributed network node 710 with the statistic may enable the distributed network node 710 to perform energy savings, even when the distributed network node is receiving the random traffic. For example, the statistic may indicate one or more parameters for transmitting data to the UE 120, using the traffic instance and according to an energy savings schedule of the UE 120. Since the distributed network node 710 can determine, according to the statistic, how often the traffic instance of the UE 120 needs to be served, the network node 710 may be able to determine whether serving the UE 120, or the traffic instance of the UE 120, will impact the ability to achieve or maintain energy savings at the distributed network node 710.

As indicated above, FIG. 7 is provided as an example. Other examples may differ from what is described with regard to FIG. 7.

Figure 8:
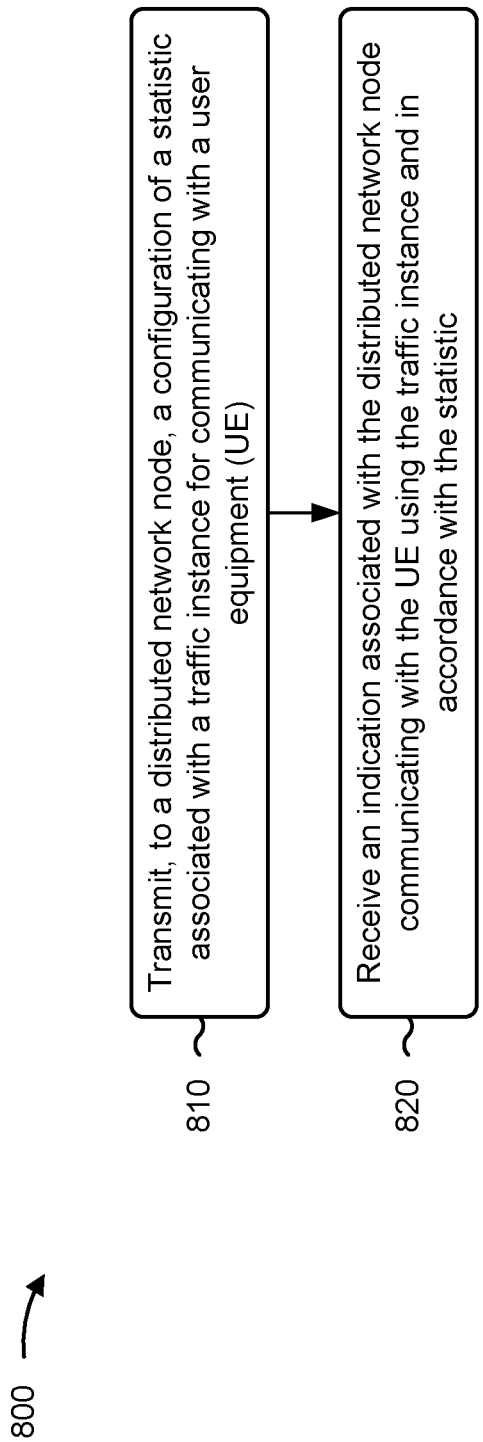
FIG. 8 is a diagram illustrating an example process associated with network energy saving, in accordance with the present disclosure.

FIG. 8 is a diagram illustrating an example process 800 performed, for example, by a central network node, in accordance with the present disclosure. Example process 800 is an example where the central network node (e.g., central network node 705) performs operations associated with network energy saving.

As shown in FIG. 8, in some aspects, process 800 may include transmitting, to a distributed network node, a configuration of a statistic associated with a traffic instance for communicating with a UE (block 810). For example, the central network node (e.g., using communication manager 150 and/or transmission component 1004, depicted in FIG. 10) may transmit, to a distributed network node, a configuration of a statistic associated with a traffic instance for communicating with a UE, as described above.

As further shown in FIG. 8, in some aspects, process 800 may include receiving an indication associated with the distributed network node communicating with the UE using the traffic instance and in accordance with the statistic (block 820). For example, the central network node (e.g., using communication manager 150 and/or reception component 1002, depicted in FIG. 10) may receive an indication associated with the distributed network node communicating with the UE using the traffic instance and in accordance with the statistic, as described above.

Process 800 may include additional aspects, such as any single aspect or any combination of aspects described below and/or in connection with one or more other processes described elsewhere herein.

In a first aspect, the statistic indicates timing information associated with a random traffic communication or an amount of data associated with the random traffic communication.

In a second aspect, alone or in combination with the first aspect, the traffic instance comprises a communication channel between the distributed network node and the UE.

In a third aspect, alone or in combination with one or more of the first and second aspects, the indication associated with the distributed network node communicating with the UE is an indication that the distributed network node is communicating with the UE, or an indication that the distributed network node will communicate with the UE, using the traffic instance and in accordance with the statistic.

In a fourth aspect, alone or in combination with one or more of the first through third aspects, the traffic instance is a data radio bearer, an F1-U tunnel, a quality of service flow, or a backhaul radio link control channel.

In a fifth aspect, alone or in combination with one or more of the first through fourth aspects, the traffic instance is configured for communicating protocol data unit packets.

In a sixth aspect, alone or in combination with one or more of the first through fifth aspects, the traffic instance is configured for communicating uplink data, downlink data, or both uplink data and downlink data.

In a seventh aspect, alone or in combination with one or more of the first through sixth aspects, the traffic instance is configured for communicating guaranteed bit rate data.

In an eighth aspect, alone or in combination with one or more of the first through seventh aspects, the traffic instance is configured for communicating delay-critical guaranteed bit rate data.

In a ninth aspect, alone or in combination with one or more of the first through eighth aspects, the statistic indicates a time interval associated with a rate requirement for communicating data using the traffic instance.

In a tenth aspect, alone or in combination with one or more of the first through ninth aspects, the time interval is an averaging window for guaranteed bit rate traffic.

In an eleventh aspect, alone or in combination with one or more of the first through tenth aspects, the statistic indicates a time period for measuring a burst volume of data that is communicated using the traffic instance.

In a twelfth aspect, alone or in combination with one or more of the first through eleventh aspects, the time period is associated with a packet delay budget.

In a thirteenth aspect, alone or in combination with one or more of the first through twelfth aspects, the statistic indicates a distribution of a burst volume of data that is communicated using the traffic instance.

In a fourteenth aspect, alone or in combination with one or more of the first through thirteenth aspects, the statistic indicates an average volume of a burst volume of data that is communicated using the traffic instance.

In a fifteenth aspect, alone or in combination with one or more of the first through fourteenth aspects, the statistic indicates a higher order moment of a burst volume of data that is communicated using the traffic instance.

In a sixteenth aspect, alone or in combination with one or more of the first through fifteenth aspects, the statistic indicates a maximum percentage of time periods, in a time interval, within which a burst volume of data may exceed a threshold, or drop below the threshold.

In a seventeenth aspect, alone or in combination with one or more of the first through sixteenth aspects, process 800 includes transmitting the configuration of the statistic to another network node.

In an eighteenth aspect, alone or in combination with one or more of the first through seventeenth aspects, the other network node is a second distributed network node, or a second central network node associated with the UE or the traffic instance.

In a nineteenth aspect, alone or in combination with one or more of the first through eighteenth aspects, transmitting the configuration of the statistic includes transmitting a time interval for measuring the statistic or a time interval for reporting the statistic.

In a twentieth aspect, alone or in combination with one or more of the first through nineteenth aspects, process 800 includes receiving a confirmation that the other network node has received the configuration of the statistic.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
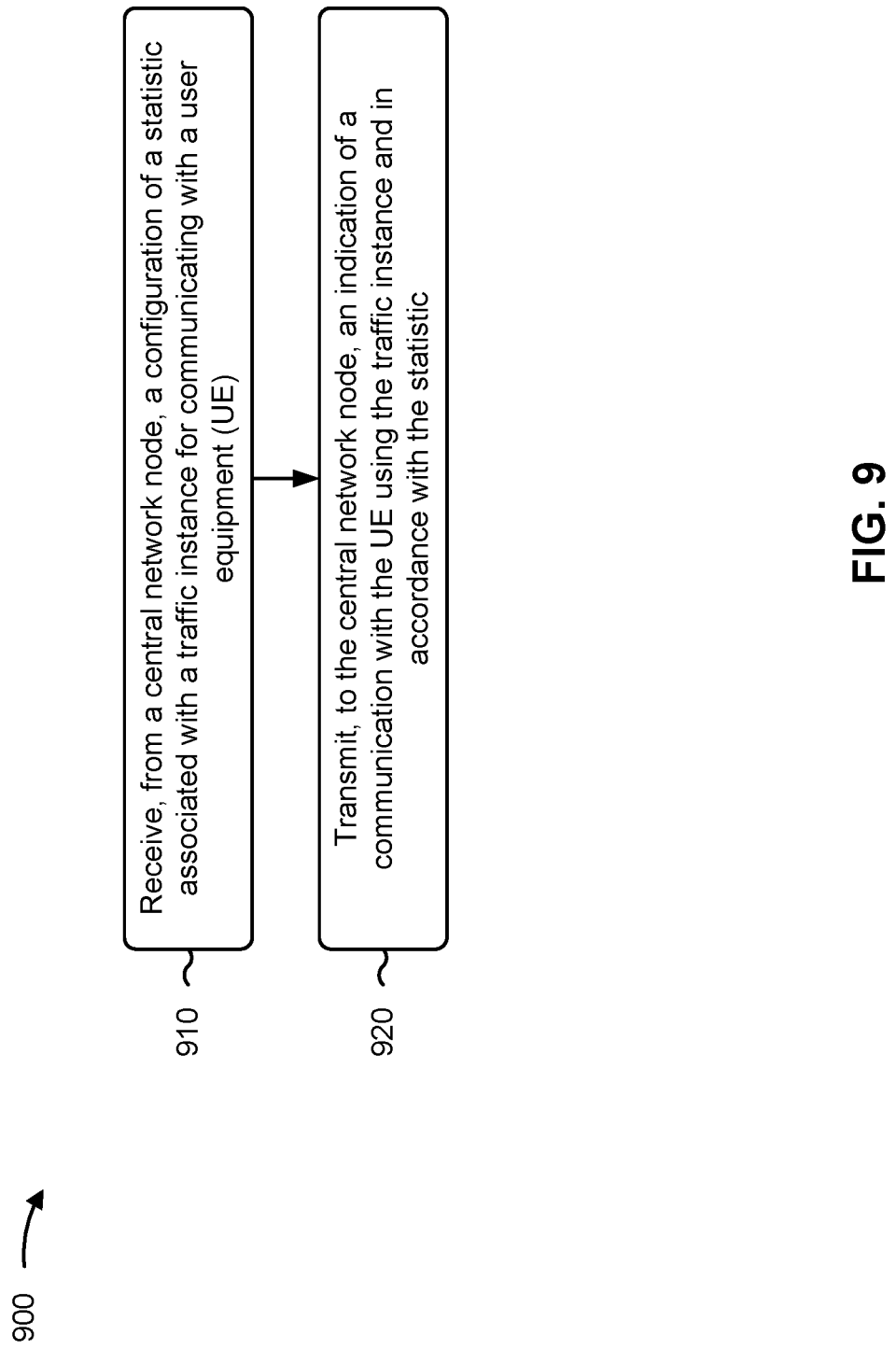
FIG. 9 is a diagram illustrating an example process associated with network energy saving, in accordance with the present disclosure.

FIG. 9 is a diagram illustrating an example process 900 performed, for example, by a distributed network node, in accordance with the present disclosure. Example process 900 is an example where the distributed network node (e.g., distributed network node 710) performs operations associated with network energy saving.

As shown in FIG. 9, in some aspects, process 900 may include receiving, from a central network node, a configuration of a statistic associated with a traffic instance for communicating with a UE (block 910). For example, the distributed network node (e.g., using communication manager 150 and/or reception component 1102, depicted in FIG. 11) may receive, from a central network node, a configuration of a statistic associated with a traffic instance for communicating with a UE, as described above.

As further shown in FIG. 9, in some aspects, process 900 may include transmitting, to the central network node, an indication of a communication with the UE using the traffic instance and in accordance with the statistic (block 920). For example, the distributed network node (e.g., using communication manager 150 and/or transmission component 1104, depicted in FIG. 11) may transmit, to the central network node, an indication of a communication with the UE using the traffic instance and in accordance with the statistic, as described above.

Process 900 may include additional aspects, such as any single aspect or any combination of aspects described below and/or in connection with one or more other processes described elsewhere herein.

In a first aspect, the statistic indicates timing information associated with a random traffic communication or an amount of data associated with the random traffic communication.

In a second aspect, alone or in combination with the first aspect, the traffic instance comprises a communication channel between the distributed network node and the UE.

In a third aspect, alone or in combination with one or more of the first and second aspects, the indication of the communication is an indication that the distributed network node is communicating with the UE, or an indication that the distributed network node will communicate with the UE, using the traffic instance and in accordance with the statistic.

In a fourth aspect, alone or in combination with one or more of the first through third aspects, the traffic instance is a data radio bearer, an F1-U tunnel, a quality of service flow, or a backhaul radio link control channel.

In a fifth aspect, alone or in combination with one or more of the first through fourth aspects, the traffic instance is configured for communicating protocol data unit packets.

In a sixth aspect, alone or in combination with one or more of the first through fifth aspects, the traffic instance is configured for communicating uplink data, downlink data, or both uplink data and downlink data.

In a seventh aspect, alone or in combination with one or more of the first through sixth aspects, the traffic instance is configured for communicating guaranteed bit rate data.

In an eighth aspect, alone or in combination with one or more of the first through seventh aspects, the traffic instance is configured for communicating delay-critical guaranteed bit rate data.

In a ninth aspect, alone or in combination with one or more of the first through eighth aspects, the statistic indicates a time interval associated with a rate requirement for communicating data using the traffic instance.

In a tenth aspect, alone or in combination with one or more of the first through ninth aspects, the time interval is an averaging window for guaranteed bit rate traffic.

In an eleventh aspect, alone or in combination with one or more of the first through tenth aspects, the statistic indicates a time period for measuring a burst volume of data that is communicated using the traffic instance.

In a twelfth aspect, alone or in combination with one or more of the first through eleventh aspects, the time period is associated with a packet delay budget.

In a thirteenth aspect, alone or in combination with one or more of the first through twelfth aspects, the statistic indicates a distribution of a burst volume of data that is communicated using the traffic instance.

In a fourteenth aspect, alone or in combination with one or more of the first through thirteenth aspects, the statistic indicates an average volume of a burst volume of data that is communicated using the traffic instance.

In a fifteenth aspect, alone or in combination with one or more of the first through fourteenth aspects, the statistic indicates a higher order moment of a burst volume of data that is communicated using the traffic instance.

In a sixteenth aspect, alone or in combination with one or more of the first through fifteenth aspects, the statistic indicates a maximum percentage of time periods, in a time interval, within which a burst volume of data may exceed a threshold, or drop below the threshold.

In a seventeenth aspect, alone or in combination with one or more of the first through sixteenth aspects, process 900 includes determining to communicate with the UE, using the traffic instance and in accordance with the statistic, based at least in part on an energy saving schedule of the distributed network node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
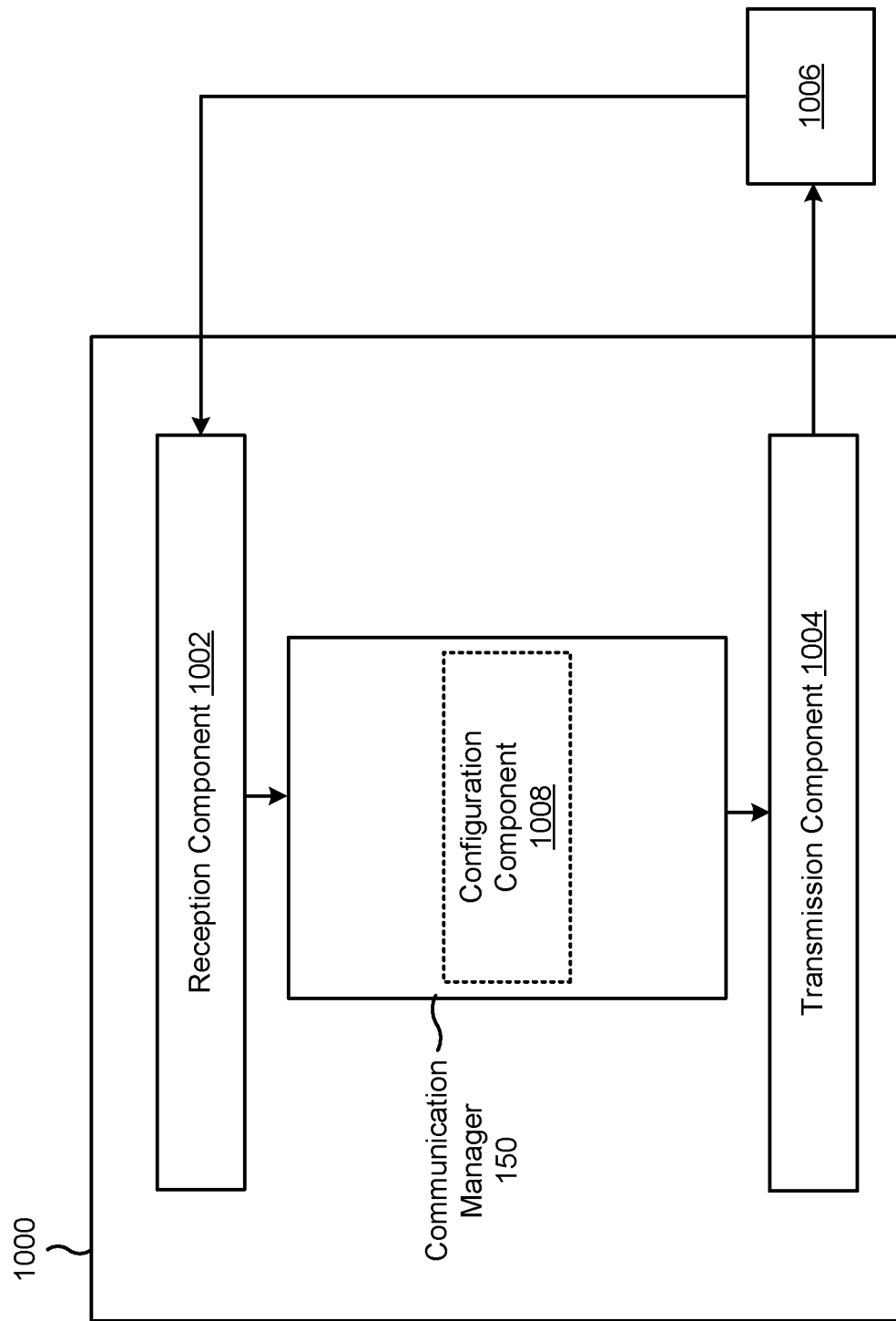
FIG. 10 is a diagram of an example apparatus for wireless communication, in accordance with the present disclosure.

FIG. 10 is a diagram of an example apparatus 1000 for wireless communication. The apparatus 1000 may be a central network node, or a central network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a configuration component 1008, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the central network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the central network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the central network node described in connection with FIG. 2. In some aspects, the transmission component 1004 may be co-located with the reception component 1002 in a transceiver.

The configuration component 1008 may determine a configuration of a statistic associated with a traffic instance for communicating with the UE.

The transmission component 1004 may transmit, to a distributed network node, a configuration of a statistic associated with a traffic instance for communicating with the UE. The reception component 1002 may receive an indication associated with the distributed network node communicating with the UE using the traffic instance and in accordance with the statistic.

The transmission component 1004 may transmit the configuration of the statistic to another network node.

The reception component 1002 may receive a confirmation that the other network node has received the configuration of the statistic.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
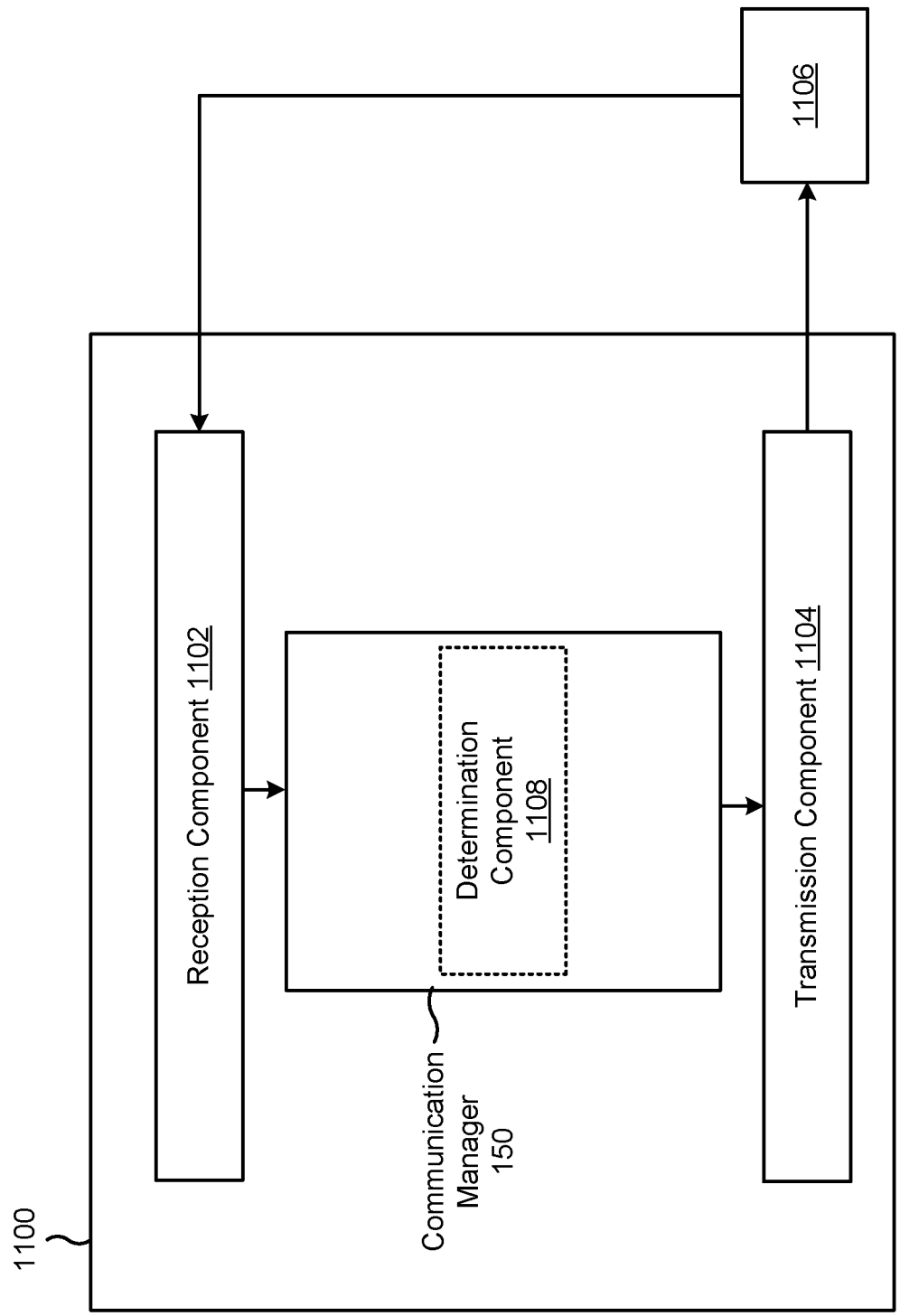
FIG. 11 is a diagram of an example apparatus for wireless communication, in accordance with the present disclosure.

FIG. 11 is a diagram of an example apparatus 1100 for wireless communication. The apparatus 1100 may be a distributed network node, or a distributed network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the distributed network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the distributed network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the distributed network node described in connection with FIG. 2. In some aspects, the transmission component 1104 may be co-located with the reception component 1102 in a transceiver.

The reception component 1102 may receive, from a central network node, a configuration of a statistic associated with a traffic instance for communicating with a UE. The transmission component 1104 may transmit, to the central network node, an indication of a communication with the UE using the traffic instance and in accordance with the statistic.

The determination component 1108 may determine to communicate with the UE, using the traffic instance and in accordance with the statistic, based at least in part on an energy saving schedule of the distributed network node.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a central network node, comprising: transmitting, to a distributed network node, a configuration of a statistic associated with a traffic instance for communicating with a user equipment (UE); and receiving an indication associated with the distributed network node communicating with the UE using the traffic instance and in accordance with the statistic.

Aspect 2: The method of Aspect 1, wherein the statistic indicates timing information associated with a random traffic communication or an amount of data associated with the random traffic communication.

Aspect 3: The method of any of Aspects 1-2, wherein the traffic instance comprises a communication channel between the distributed network node and the UE.

Aspect 4: The method of any of Aspects 1-3, wherein the indication associated with the distributed network node communicating with the UE is an indication that the distributed network node is communicating with the UE, or an indication that the distributed network node will communicate with the UE, using the traffic instance and in accordance with the statistic.

Aspect 5: The method of any of Aspects 1-4, wherein the traffic instance is a data radio bearer, an F1-U tunnel, a quality of service flow, or a backhaul radio link control channel.

Aspect 6: The method of any of Aspects 1-5, wherein the traffic instance is configured for communicating protocol data unit packets.

Aspect 7: The method of any of Aspects 1-6, wherein the traffic instance is configured for communicating uplink data, downlink data, or both uplink data and downlink data.

Aspect 8: The method of any of Aspects 1-7, wherein the traffic instance is configured for communicating guaranteed bit rate data.

Aspect 9: The method of any of Aspects 1-8, wherein the traffic instance is configured for communicating delay-critical guaranteed bit rate data.

Aspect 10: The method of any of Aspects 1-9, wherein the statistic indicates a time interval associated with a rate requirement for communicating data using the traffic instance.

Aspect 11: The method of Aspect 10, wherein the time interval is an averaging window for guaranteed bit rate traffic.

Aspect 12: The method of any of Aspects 1-11, wherein the statistic indicates a time period for measuring a burst volume of data that is communicated using the traffic instance.

Aspect 13: The method of Aspect 12, wherein the time period is associated with a packet delay budget.

Aspect 14: The method of any of Aspects 1-13, wherein the statistic indicates a distribution of a burst volume of data that is communicated using the traffic instance.

Aspect 15: The method of any of Aspects 1-14, wherein the statistic indicates an average volume of a burst volume of data that is communicated using the traffic instance.

Aspect 16: The method of any of Aspects 1-15, wherein the statistic indicates a higher order moment of a burst volume of data that is communicated using the traffic instance.

Aspect 17: The method of any of Aspects 1-16, wherein the statistic indicates a maximum percentage of time periods, in a time interval, within which a burst volume of data may exceed a threshold, or drop below the threshold.

Aspect 18: The method of any of Aspects 1-17, further comprising transmitting the configuration of the statistic to another network node.

Aspect 19: The method of Aspect 18, wherein the other network node is a second distributed network node, or a second central network node associated with the UE or the traffic instance.

Aspect 20: The method of Aspect 18, wherein transmitting the configuration of the statistic includes transmitting a time interval for measuring the statistic or a time interval for reporting the statistic.

Aspect 21: The method of Aspect 18, further comprising receiving a confirmation that the other network node has received the configuration of the statistic.

Aspect 22: A method of wireless communication performed by a distributed network node, comprising: receiving, from a central network node, a configuration of a statistic associated with a traffic instance for communicating with a user equipment (UE); and transmitting, to the central network node, an indication of a communication with the UE using the traffic instance and in accordance with the statistic.

Aspect 23: The method of Aspect 22, wherein the statistic indicates timing information associated with a random traffic communication or an amount of data associated with the random traffic communication.

Aspect 24: The method of any of Aspects 22-23, wherein the traffic instance comprises a communication channel between the distributed network node and the UE.

Aspect 25: The method of any of Aspects 22-24, wherein the indication of the communication is an indication that the distributed network node is communicating with the UE, or an indication that the distributed network node will communicate with the UE, using the traffic instance and in accordance with the statistic.

Aspect 26: The method of any of Aspects 22-25, wherein the traffic instance is a data radio bearer, an F1-U tunnel, a quality of service flow, or a backhaul radio link control channel.

Aspect 27: The method of any of Aspects 22-26, wherein the traffic instance is configured for communicating protocol data unit packets.

Aspect 28: The method of any of Aspects 22-27, wherein the traffic instance is configured for communicating uplink data, downlink data, or both uplink data and downlink data.

Aspect 29: The method of any of Aspects 22-28, wherein the traffic instance is configured for communicating guaranteed bit rate data.

Aspect 30: The method of any of Aspects 22-29, wherein the traffic instance is configured for communicating delay-critical guaranteed bit rate data.

Aspect 31: The method of any of Aspects 22-30, wherein the statistic indicates a time interval associated with a rate requirement for communicating data using the traffic instance.

Aspect 32: The method of Aspect 31, wherein the time interval is an averaging window for guaranteed bit rate traffic.

Aspect 33: The method of any of Aspects 22-32, wherein the statistic indicates a time period for measuring a burst volume of data that is communicated using the traffic instance.

Aspect 34: The method of Aspect 33, wherein the time period is associated with a packet delay budget.

Aspect 35: The method of any of Aspects 22-34, wherein the statistic indicates a distribution of a burst volume of data that is communicated using the traffic instance.

Aspect 36: The method of any of Aspects 22-35, wherein the statistic indicates an average volume of a burst volume of data that is communicated using the traffic instance.

Aspect 37: The method of any of Aspects 22-36, wherein the statistic indicates a higher order moment of a burst volume of data that is communicated using the traffic instance.

Aspect 38: The method of any of Aspects 22-37, wherein the statistic indicates a maximum percentage of time periods, in a time interval, within which a burst volume of data may exceed a threshold, or drop below the threshold.

Aspect 39: The method of any of Aspects 22-38, further comprising determining to communicate with the UE, using the traffic instance and in accordance with the statistic, based at least in part on an energy saving schedule of the distributed network node.

Aspect 40: An apparatus for wireless communication at a device, comprising a processor; memory coupled with the processor; and instructions stored in the memory and executable by the processor to cause the apparatus to perform the method of one or more of Aspects 1-21.

Aspect 41: A device for wireless communication, comprising a memory and one or more processors coupled to the memory, the one or more processors configured to perform the method of one or more of Aspects 1-21.

Aspect 42: An apparatus for wireless communication, comprising at least one means for performing the method of one or more of Aspects 1-21.

Aspect 43: A non-transitory computer-readable medium storing code for wireless communication, the code comprising instructions executable by a processor to perform the method of one or more of Aspects 1-21.

Aspect 44: A non-transitory computer-readable medium storing a set of instructions for wireless communication, the set of instructions comprising one or more instructions that, when executed by one or more processors of a device, cause the device to perform the method of one or more of Aspects 1-21.

Aspect 45: An apparatus for wireless communication at a device, comprising a processor; memory coupled with the processor; and instructions stored in the memory and executable by the processor to cause the apparatus to perform the method of one or more of Aspects 22-39.

Aspect 46: A device for wireless communication, comprising a memory and one or more processors coupled to the memory, the one or more processors configured to perform the method of one or more of Aspects 22-39.

Aspect 47: An apparatus for wireless communication, comprising at least one means for performing the method of one or more of Aspects 22-39.

Aspect 48: A non-transitory computer-readable medium storing code for wireless communication, the code comprising instructions executable by a processor to perform the method of one or more of Aspects 22-39.

Aspect 49: A non-transitory computer-readable medium storing a set of instructions for wireless communication, the set of instructions comprising one or more instructions that, when executed by one or more processors of a device, cause the device to perform the method of one or more of Aspects 22-39.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a central network node, comprising:
   one or more memories; and
   one or more processors, coupled to the one or more memories, configured to:
   transmit, to a distributed network node, a configuration of a statistic indicating one or more parameters, associated with random traffic that is different from scheduled traffic, for communicating with a user equipment (UE) using a traffic instance and in accordance with an energy savings schedule of the distributed network node,
   wherein the random traffic includes guaranteed bitrate traffic and non-guaranteed bitrate traffic and the traffic instance is associated with the guaranteed bitrate traffic or the non-guaranteed bitrate traffic, and
   wherein the traffic instance is used in accordance with the statistic and based at least in part on the distributed network node coordinating the energy savings schedule of the distributed network node with the scheduled traffic and with the random traffic; and
   receive an indication associated with the distributed network node communicating with the UE using the traffic instance and in accordance with the statistic.

2. The apparatus of claim 1, wherein the statistic indicates timing information associated with a random traffic communication or an amount of data associated with the random traffic communication.

3. The apparatus of claim 1, wherein the traffic instance comprises a communication channel between the distributed network node and the UE.

4. The apparatus of claim 1, wherein the indication associated with the distributed network node communicating with the UE is an indication that the distributed network node is communicating with the UE, or an indication that the distributed network node will communicate with the UE, using the traffic instance and in accordance with the statistic.

5. The apparatus of claim 1, wherein the traffic instance is a data radio bearer, an F1-U tunnel, a quality of service flow, or a backhaul radio link control channel.

6. The apparatus of claim 1, wherein the traffic instance is configured for communicating guaranteed bit rate data.

7. The apparatus of claim 1, wherein the traffic instance is configured for communicating delay-critical guaranteed bit rate data.

8. The apparatus of claim 1, wherein the statistic indicates a time interval associated with a rate requirement for communicating data using the traffic instance.

9. The apparatus of claim 1, wherein the statistic indicates a time period for measuring a burst volume of data that is communicated using the traffic instance.

10. An apparatus for wireless communication at a distributed network node, comprising:
one or more memories; and
one or more processors, coupled to the one or more memories, configured to:
receive, from a central network node, a configuration of a statistic indicating one or more parameters, associated with random traffic that is different from scheduled traffic, for communicating with a user equipment (UE) using a traffic instance and in accordance with an energy savings schedule of the distributed network node,
wherein the random traffic includes guaranteed bitrate traffic and non-guaranteed bitrate traffic and the traffic instance is associated with the guaranteed bitrate traffic or the non-guaranteed bitrate traffic;
determine, in accordance with the statistic, whether communicating with the UE using the traffic instance impacts the energy savings schedule of the distributed network node,
wherein the energy savings schedule is coordinated with the scheduled traffic and with the random traffic; and
transmit, to the central network node and based at least in part on the determining, an indication of a communication with the UE using the traffic instance and in accordance with the statistic.

11. The apparatus of claim 10, wherein the statistic indicates timing information associated with a random traffic communication or an amount of data associated with the random traffic communication.

12. The apparatus of claim 10, wherein the traffic instance comprises a communication channel between the distributed network node and the UE.

13. The apparatus of claim 10, wherein the indication of the communication is an indication that the distributed network node is communicating with the UE, or an indication that the distributed network node will communicate with the UE, using the traffic instance and in accordance with the statistic.

14. The apparatus of claim 10, wherein the traffic instance is a data radio bearer, an F1-U tunnel, a quality of service flow, or a backhaul radio link control channel.

15. The apparatus of claim 10, wherein the traffic instance is configured for communicating guaranteed bit rate data.

16. The apparatus of claim 10, wherein the traffic instance is configured for communicating delay-critical guaranteed bit rate data.

17. The apparatus of claim 10, wherein the statistic indicates a time interval associated with a rate requirement for communicating data using the traffic instance.

18. The apparatus of claim 10, wherein the statistic indicates a time period for measuring a burst volume of data that is communicated using the traffic instance.

19. A method of wireless communication performed by a central network node, comprising:
transmitting, to a distributed network node, a configuration of a statistic indicating one or more parameters, associated with random traffic that is different from scheduled traffic, for communicating with a user equipment (UE) using a traffic instance and in accordance with an energy savings schedule of the distributed network node,
wherein the random traffic includes guaranteed bitrate traffic and non-guaranteed bitrate traffic and the traffic instance is associated with the guaranteed bitrate traffic or the non-guaranteed bitrate traffic, and
wherein the traffic instance is used in accordance with the statistic and based at least in part on the distributed network node coordinating the energy savings schedule of the distributed network node with the scheduled traffic and with the random traffic; and
receiving an indication associated with the distributed network node communicating with the UE using the traffic instance and in accordance with the statistic.

20. The method of claim 19, wherein the statistic indicates timing information associated with a random traffic communication or an amount of data associated with the random traffic communication.

21. The method of claim 19, wherein the traffic instance comprises a communication channel between the distributed network node and the UE.

22. The method of claim 19, wherein the indication associated with the distributed network node communicating with the UE is an indication that the distributed network node is communicating with the UE, or an indication that the distributed network node will communicate with the UE, using the traffic instance and in accordance with the statistic.

23. The method of claim 19, wherein the traffic instance is a data radio bearer, an F1-U tunnel, a quality of service flow, or a backhaul radio link control channel.

24. The method of claim 19, wherein the traffic instance is configured for communicating guaranteed bit rate data.

25. A method of wireless communication performed by a distributed network node, comprising:
receiving, from a central network node, a configuration of a statistic indicating one or more parameters, associated with random traffic that is different from scheduled traffic, for communicating with a user equipment (UE) using a traffic instance and in accordance with an energy savings schedule of the distributed network node,
wherein the random traffic includes guaranteed bitrate traffic and non-guaranteed bitrate traffic and the traffic instance is associated with the guaranteed bitrate traffic or the non-guaranteed bitrate traffic;
determining, in accordance with the statistic, whether communicating with the UE using the traffic instance impacts the energy savings schedule of the distributed network node,
wherein the energy savings schedule is coordinated with the scheduled traffic and with the random traffic; and
transmitting, to the central network node and based at least in part on the determining, an indication of a communication with the UE using the traffic instance and in accordance with the statistic.

26. The method of claim 25, wherein the statistic indicates timing information associated with a random traffic communication or an amount of data associated with the random traffic communication.

27. The method of claim 25, wherein the traffic instance comprises a communication channel between the distributed network node and the UE.

28. The method of claim 25, wherein the indication of the communication is an indication that the distributed network node is communicating with the UE, or an indication that the distributed network node will communicate with the UE, using the traffic instance and in accordance with the statistic.

29. The method of claim 25, wherein the traffic instance is a data radio bearer, an F1-U tunnel, a quality of service flow, or a backhaul radio link control channel.

30. The method of claim 25, wherein the traffic instance is configured for communicating guaranteed bit rate data.

* * * * *